United States Patent
Telfer et al.

(10) Patent No.: US 11,460,722 B2
(45) Date of Patent: Oct. 4, 2022

(54) COLORED ELECTROPHORETIC DISPLAYS

(71) Applicant: E Ink Corporation, Billerica, MA (US)

(72) Inventors: Stephen J. Telfer, Arlington, MA (US); Eugene Bzowej, Reading, MA (US); Kenneth R. Crounse, Somerville, MA (US); John L. Marshall, Sedgwick, ME (US); Brandon Macdonald, Melrose, MA (US); Ziyan Wu, Wayland, MA (US); Lee Yezek, Watertown, MA (US)

(73) Assignee: E Ink Corporation, Billerica, MA (US)

( * ) Notice: Subject to any disclaimer, the term of this patent is extended or adjusted under 35 U.S.C. 154(b) by 370 days.

(21) Appl. No.: 16/867,969

(22) Filed: May 6, 2020

(65) Prior Publication Data

US 2020/0355946 A1 Nov. 12, 2020

Related U.S. Application Data

(60) Provisional application No. 62/846,342, filed on May 10, 2019.

(51) Int. Cl.
*G02F 1/00* (2006.01)
*G09G 3/34* (2006.01)
*G02F 1/167* (2019.01)

(52) U.S. Cl.
CPC ........... *G02F 1/0018* (2013.01); *G09G 3/344* (2013.01); *G02F 1/167* (2013.01)

(58) Field of Classification Search
CPC .................. G02F 1/0018; G02F 1/167; G02F 2001/1678; G09G 3/344; C09K 9/02
See application file for complete search history.

(56) References Cited

U.S. PATENT DOCUMENTS

| | | |
|---|---|---|
| 4,418,346 A | 11/1983 | Batchelder |
| 5,872,552 A | 2/1999 | Gordon, II et al. |
| 5,930,026 A | 7/1999 | Jacobson et al. |
| 6,017,584 A | 1/2000 | Albert et al. |
| 6,130,774 A | 10/2000 | Albert et al. |
| 6,144,361 A | 11/2000 | Gordon, II et al. |
| 6,172,798 B1 | 1/2001 | Albert et al. |
| 6,184,856 B1 | 2/2001 | Gordon, II et al. |
| 6,225,971 B1 | 5/2001 | Gordon, II et al. |

(Continued)

FOREIGN PATENT DOCUMENTS

KR 20130076200 A 7/2013

OTHER PUBLICATIONS

Kitamura, T. et al., "Electrical toner movement for electronic paper-like display", Asia Display/IDW '01, pp. 1517-1520, Paper HCS1-1 (2001).

(Continued)

*Primary Examiner* — Mark W Regn
(74) *Attorney, Agent, or Firm* — Brian D. Bean

(57) ABSTRACT

An electrophoretic medium includes a fluid, a plurality of light scattering charged particles having a first polarity, and a first, second, and third set of particles, each set having a color different from each other set. The first and second particles may have a second polarity opposite to the first polarity, and the mobility of the third set of particles is less than half of the mobility of the light scattering particles, the first set of charged particles, and the second set of charged particles.

23 Claims, 5 Drawing Sheets

(56) References Cited

U.S. PATENT DOCUMENTS

| | | |
|---|---|---|
| 6,241,921 B1 | 6/2001 | Jacobson et al. |
| 6,271,823 B1 | 8/2001 | Gordon, II et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,664,944 B1 | 12/2003 | Albert et al. |
| 6,672,921 B1 | 1/2004 | Liang et al. |
| 6,727,873 B2 | 4/2004 | Gordon, II et al. |
| 6,753,999 B2 | 6/2004 | Zehner et al. |
| 6,788,449 B2 | 9/2004 | Liang et al. |
| 6,822,782 B2 | 11/2004 | Honeyman |
| 6,825,970 B2 | 11/2004 | Goenaga et al. |
| 6,864,875 B2 | 3/2005 | Drzaic et al. |
| 6,866,760 B2 | 3/2005 | Paolini, Jr. et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman |
| 7,023,420 B2 | 4/2006 | Comiskey et al. |
| 7,034,783 B2 | 4/2006 | Gates et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,167,155 B1 | 1/2007 | Albert et al. |
| 7,170,670 B2 | 1/2007 | Webber |
| 7,193,625 B2 | 3/2007 | Danner et al. |
| 7,202,847 B2 | 4/2007 | Gates |
| 7,236,291 B2 | 6/2007 | Kaga et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,499,211 B2 | 3/2009 | Suwabe et al. |
| 7,528,822 B2 | 5/2009 | Amundson et al. |
| 7,535,624 B2 | 5/2009 | Amundson et al. |
| 7,545,358 B2 | 6/2009 | Gates et al. |
| 7,561,324 B2 | 7/2009 | Duthaler et al. |
| 7,583,251 B2 | 9/2009 | Arango et al. |
| 7,602,374 B2 | 10/2009 | Zehner et al. |
| 7,612,760 B2 | 11/2009 | Kawai |
| 7,667,684 B2 | 2/2010 | Jacobson et al. |
| 7,679,599 B2 | 3/2010 | Kawai |
| 7,679,814 B2 | 3/2010 | Paolini, Jr. et al. |
| 7,688,297 B2 | 3/2010 | Zehner et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,791,789 B2 | 9/2010 | Albert et al. |
| 7,839,564 B2 | 11/2010 | Whitesides et al. |
| 7,848,009 B2 | 12/2010 | Machida et al. |
| 7,885,457 B2 | 2/2011 | Hirano et al. |
| 7,910,175 B2 | 3/2011 | Webber |
| 7,952,557 B2 | 5/2011 | Amundson |
| 7,952,790 B2 | 5/2011 | Honeyman |
| 7,956,841 B2 | 6/2011 | Albert et al. |
| 7,999,787 B2 | 8/2011 | Amundson et al. |
| 8,009,348 B2 | 8/2011 | Zehner et al. |
| 8,023,176 B2 | 9/2011 | Akashi et al. |
| 8,031,392 B2 | 10/2011 | Hiji et al. |
| 8,040,594 B2 | 10/2011 | Paolini, Jr. et al. |
| 8,054,526 B2 | 11/2011 | Bouchard |
| 8,077,141 B2 | 12/2011 | Duthaler et al. |
| 8,098,418 B2 | 1/2012 | Paolini, Jr. et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,174,491 B2 | 5/2012 | Machida et al. |
| 8,213,076 B2 | 7/2012 | Albert et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,319,759 B2 | 11/2012 | Jacobson et al. |
| 8,363,299 B2 | 1/2013 | Paolini, Jr. et al. |
| 8,384,658 B2 | 2/2013 | Albert et al. |
| 8,441,714 B2 | 5/2013 | Paolini, Jr. et al. |
| 8,441,716 B2 | 5/2013 | Paolini, Jr. et al. |
| 8,466,852 B2 | 6/2013 | Drzaic et al. |
| 8,542,431 B2 | 9/2013 | Shuto et al. |
| 8,558,783 B2 | 10/2013 | Wilcox et al. |
| 8,558,785 B2 | 10/2013 | Zehner et al. |
| 8,576,470 B2 | 11/2013 | Paolini, Jr. et al. |
| 8,576,476 B2 | 11/2013 | Telfer et al. |
| 8,587,859 B2 | 11/2013 | Kayashima et al. |
| 8,593,721 B2 | 11/2013 | Albert et al. |
| 8,704,754 B2 | 4/2014 | Machida et al. |
| 8,717,664 B2 | 5/2014 | Wang et al. |
| 8,730,216 B2 | 5/2014 | Mizutani et al. |
| 8,730,559 B2 | 5/2014 | Akashi et al. |
| 8,797,634 B2 | 8/2014 | Paolini, Jr. et al. |
| 8,830,559 B2 | 9/2014 | Honeyman et al. |
| 8,873,129 B2 | 10/2014 | Paolini, Jr. et al. |
| 8,902,153 B2 | 12/2014 | Bouchard et al. |
| 8,917,439 B2 | 12/2014 | Wang et al. |
| 8,928,562 B2 | 1/2015 | Gates et al. |
| 8,964,282 B2 | 2/2015 | Wang et al. |
| 9,116,412 B2 | 8/2015 | Lin |
| 9,152,005 B2 | 10/2015 | Morikawa et al. |
| 9,170,467 B2 | 10/2015 | Whitesides et al. |
| 9,199,441 B2 | 12/2015 | Danner |
| 9,230,492 B2 | 1/2016 | Harrington et al. |
| 9,293,511 B2 | 3/2016 | Jacobson et al. |
| 9,348,193 B2 | 5/2016 | Hiji et al. |
| 9,412,314 B2 | 8/2016 | Amundson et al. |
| 9,429,810 B2 | 8/2016 | Kaino et al. |
| 9,672,766 B2 | 6/2017 | Sjodin |
| 9,697,778 B2 | 7/2017 | Telfer et al. |
| 9,759,978 B2 | 9/2017 | Liu |
| 9,921,451 B2 | 3/2018 | Telfer et al. |
| 10,031,394 B2 | 7/2018 | Nakayama et al. |
| 10,162,242 B2 | 12/2018 | Wang et al. |
| 10,319,313 B2 | 6/2019 | Harris et al. |
| 2003/0102858 A1 | 6/2003 | Jacobson et al. |
| 2005/0253777 A1 | 11/2005 | Zehner et al. |
| 2007/0091418 A1 | 4/2007 | Danner et al. |
| 2007/0103427 A1 | 5/2007 | Zhou et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048970 A1 | 2/2008 | Drzaic et al. |
| 2008/0136774 A1 | 6/2008 | Harris et al. |
| 2009/0174651 A1 | 7/2009 | Jacobson et al. |
| 2009/0225398 A1 | 9/2009 | Duthaler et al. |
| 2009/0322721 A1 | 12/2009 | Zehner et al. |
| 2010/0060628 A1 | 3/2010 | Lenssen et al. |
| 2010/0156780 A1 | 6/2010 | Jacobson et al. |
| 2010/0220121 A1 | 9/2010 | Zehner et al. |
| 2010/0265561 A1 | 10/2010 | Gates et al. |
| 2011/0175939 A1 | 7/2011 | Moriyama et al. |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2012/0293858 A1 | 11/2012 | Telfer et al. |
| 2012/0326957 A1 | 12/2012 | Drzaic et al. |
| 2013/0194250 A1 | 8/2013 | Amundson et al. |
| 2013/0222884 A1 | 8/2013 | Moriyama et al. |
| 2013/0222886 A1 | 8/2013 | Kawahara et al. |
| 2013/0222888 A1 | 8/2013 | Urano et al. |

(56) References Cited

U.S. PATENT DOCUMENTS

| | | | |
|---|---|---|---|
| 2014/0011913 A1 | 1/2014 | Du et al. | |
| 2015/0185509 A1* | 7/2015 | Wang | G02F 1/167 |
| | | | 252/500 |
| 2017/0263175 A1* | 9/2017 | Crounse | G09G 3/344 |

OTHER PUBLICATIONS

Yamaguchi, Y. et al., "Toner display using insulative particles charged triboelectrically", Asia Display/IDW '01, pp. 1729-1730, Paper AMD4-4 (2001).
Heikenfeld, J. et al., "A critical review of the present and future prospects for eleclionic paper", SID, 19(2), pp. 129-156 (2011).
Korean Intellectual Property Office, PCT/US2020/031818, International Search Report and Written Opinion, dated Aug. 21, 2020.

\* cited by examiner

Table 2

| Yellow Pigment | Scale (g) | PDMS-containing monomer* (g) | MMA (g) | TFEM (g) | STYRENE (g) | Polymer molecular weight | Polymer coverage (wt%) | Particle size mode (microns) | Zeta Potential (mV) |
|---|---|---|---|---|---|---|---|---|---|
| 1 |  | 0.00 | 0.00 | 0.00 | 0.00 |  | 0.00 |  | 55.00 |
| 2 | 50.00 | 13.20 | 6.40 | 0.00 | 0.00 |  | 11.36 | 0.57 | 0.00 |
| 3 | 25.00 | 12.90 | 8.40 | 2.70 | 0.00 |  | 29.22 | 0.39 | 2.00 |
| 4 | 20.00 | 25.32 | 0.00 | 0.00 | 12.66 |  | 18.16 | 0.21 | 65.00 |
| 5 | 20.00 | 12.90 | 5.00 | 5.00 | 0.00 | 215000 | 30.26 | 0.52 | -82.00 |
| 6 | 30.00 | 15.00 | 8.50 | 2.50 | 0.00 | 379000 | 27.77 | 0.81 | -4.00 |
| 7 | 20.00 | 7.50 | 4.25 | 1.25 | 0.00 |  | 23.31 | 0.35 | 15.00 |
| 8 | 25.00 | 6.00 | 3.42 | 1.05 | 0.00 | 105784 | 11.97 | 0.38 | 46.00 |
| 9 | 30.00 | 50.64 | 0.00 | 0.00 | 25.33 | 92000 | 28 | 0.35 | 86.00 |
| 10 | 25.00 | 15.80 | 0.00 | 0.00 | 7.90 | 19000 | 9.14 | 1.75 | -68.00 |
| 11 | 50.00 | 25.80 | 12.90 | 0.00 | 0.00 | 155196 | 22.11 | 0.33 | 47.00 |
| 13 | 25.00 | 25.00 | 8.00 | 0.00 | 8.00 |  | 34.17 | 1.18 | -5.00 |
| 14 | 25.00 | 13.10 | 6.4 | 0.00 | 0.00 | 202000 | 7.12 | 1.85 | -53.00 |
| 15 | 25.00 | 12.90 | 5.60 | 1.80 | 0.00 | 243000 | 26.32 | 0.32 | -40.00 |
| 16 | 25.00 | 9.45 | 5.91 | 1.88 | 0.00 | 153000 | 29.17 | 0.33 | -9.00 |
| 17 | 25.00 | 9.45 | 6.14 | 1.64 | 0.00 |  | 25.16 | 0.28 | -15.00 |
| 18 | 25.00 | 5.67 | 3.68 | 0.98 | 0.00 |  | 15.88 | 0.44 | -35.00 |
| 19 | 25.00 | 6.00 | 3.40 | 0.60 | 0.00 | 70365 | 14.54 | 0.41 | -22.00 |
| 20 | 30.00 | 9.00 | 5.10 | 0.90 | 0.00 | 297929 | 17.44 | 0.29 | -19.00 |
| 21 | 30.00 | 15.50 | 9.00 | 3.80 | 0.00 | 50630 | 34.27 | 0.92 | -14.00 |
| 22 | 30.00 | 7.73 | 4.67 | 1.48 | 0.00 |  | 10.86 | 1.42 | -45.00 |
| 23 | 30.00 | 15.72 | 7.68 | 0.00 | 0.00 |  | 23.06 | 0.26 | 28.50 |
| 24 | 30.00 | 11.59 | 7.00 | 2.22 | 0.00 | 134826 | 28.19 | 0.37 | -9.00 |
| 25 | 31.60 | 6.4** | 10.80 | 3.50 | 0.00 | 147161 | 28.50 | 0.486 | -2.00 |
| 26 | 29.40 | 8** | 10.10 | 3.20 | 0.00 | 214328 | 32.30 | 0.468 | -16.00 |

* MCR-M22, available from Gelest, Inc., unless otherwise stated
** MCR-M17, available from Gelest, Inc.

*Figure 9*

COLORED ELECTROPHORETIC DISPLAYS

REFERENCE TO RELATED APPLICATIONS

This application claims priority to U.S. Patent Application No. 62/846,342 filed on May 10, 2019, which is incorporated by reference herein in its entirety.

BACKGROUND OF INVENTION

This invention relates to colored electrophoretic displays, and more specifically to electrophoretic displays capable of rendering more than two colors using a single layer of electrophoretic material comprising a plurality of colored particles.

The term color as used herein includes black and white. White particles are often of the light scattering type.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719, (c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 6,017,584; 6,664,944; 6,864,875; 7,075,502; 7,167,155; 7,667,684; 7,791,789; 7,839,564; 7,956,841; 8,040,594; 8,054,526; 8,098,418; 8,213,076; and 8,363,299, and U.S. Patent Applications Publication Nos. 2004/0263947; 2007/0223079; 2008/0023332; 2008/0043318; 2008/0048970; 2009/0004442, 2009/0225398, 2010/0103502, 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957;

(f) Methods for driving displays; see for example U.S. Pat. Nos. 5,930,026, 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339;

7,528,822; 7,545,358; 7,583,251; 7,602,374; 7,612,760; 7,679,599; 7,688,297, 7,729,039; 7,733,311; 7,733,335; 7,787,169; 7,952,557; 7,956,841; 7,999,787; 8,077,141; 8,125,501; 8,139,050; 8,174,490; 8,289,250; 8,300,006; 8,305,341; 8,314,784; 8,384,658; 8,558,783; and 8,558,785; and U.S. Patent Applications Publication Nos. 2003/0102858; 2005/0122284; 2005/0253777; 2007/0091418; 2007/0103427; 2008/0024429; 2008/0024482; 2008/0136774; 2008/0291129, 2009/0174651, 2009/0179923, 2009/0195568; 2009/0322721; 2010/0220121; 2010/0265561; 2011/0193840; 2011/0193841; 2011/0199671; 2011/0285754; and 2013/0194250 (these patents and applications may hereinafter be referred to as the MEDEOD (MEthods for Driving Electro-optic Displays) applications);

(g) Applications of displays, see for example U.S. Pat. Nos. 7,312,784 and 8,009,348; and (h) Non-electrophoretic displays, as described in U.S. Pat. Nos. 6,241,921; 6,950,220; 7,420,549 and 8,319,759, and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823, 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating, spray coating; meniscus coating; spin coating; brush coating; air knife coating; silk screen printing processes; electrostatic printing processes; thermal printing processes, ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

The aforementioned U.S. Pat. No. 6,982,178 describes a method of assembling a solid electro-optic display (including an encapsulated electrophoretic display) which is well adapted for mass production. Essentially, this patent describes a so-called front plane laminate (FPL) which comprises, in order, a light-transmissive electrically-conductive layer, a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term light-transmissive is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term light-transmissive should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically-conductive layer is conveniently a thin metal or metal oxide layer of, for example, aluminum or indium tin oxide (ITO), or may be a conductive polymer. Poly(ethylene terephthalate) (PET) films coated with aluminum or ITO are available commercially, for example as aluminized Mylar (Mylar is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called double release sheet which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called inverted front plane laminate, which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium, and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

Multilayer, stacked electrophoretic displays are known in the art; see, for example, J. Heikenfeld, P. Drzaic, J-S Yeo and T. Koch, Journal of the SID, 19(2), 2011, pp. 129-156. In such displays, ambient light passes through images in each of the three subtractive primary colors, in precise analogy with conventional color printing. U.S. Pat. No. 6,727,873 describes a stacked electrophoretic display in which three layers of switchable cells are placed over a reflective background. Similar displays are known in which colored particles are moved laterally (see International Application No. WO 2008/065605) or, using a combination of vertical and lateral motion, sequestered into micropits. In both cases, each layer is provided with electrodes that serve to concentrate or disperse the colored particles on a pixel-by-pixel basis, so that each of the three layers requires a layer of thin-film transistors (TFT's) (two of the three layers of TFT's must be substantially transparent) and a light-transmissive counter-electrode. Such a complex arrangement of electrodes is costly to manufacture, and in the present state of the art it is difficult to provide an adequately transparent plane of pixel electrodes, especially as the white state of the display must be viewed through several layers of electrodes. Multi-layer displays also suffer from parallax problems as the thickness of the display stack approaches or exceeds the pixel size.

U.S. Applications Publication Nos. 2012/0008188 and 2012/0134009 describe multicolor electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Patent Application Publication No. 2013/0208338 describes a color display comprising an electrophoretic fluid which comprises one or two types of pigment particles dispersed in a clear and colorless or colored solvent, the electrophoretic fluid being sandwiched between a common electrode and a plurality of driving electrodes. The driving electrodes are kept at a certain distance in order to expose a background layer. U.S. Patent Application Publication No. 2014/0177031 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage which is about 1 to about 20% of the full driving voltage. U.S. Patent Application Publication No. 2014/0092465 and 2014/0092466 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both. None of these patent applications disclose full color display in the sense in which that term is used below.

U.S. Patent Application Publication No. 2007/0031031 describes an image processing device for processing image data in order to display an image on a display medium in which each pixel is capable of displaying white, black and one other color. U.S. Patent Applications Publication Nos. 2008/0151355, 2010/0188732; and 2011/0279885 describe a color display in which mobile particles move through a porous structure. U.S. Patent Applications Publication Nos. 2008/0303779 and 2010/0020384 describe a display medium comprising first, second and third particles of differing colors. The first and second particles can form aggregates, and the smaller third particles can move through apertures left between the aggregated first and second particles. U.S. Patent Application Publication No. 2011/0134506 describes a display device including an electrophoretic display element including plural types of particles enclosed between a pair of substrates, at least one of the substrates being translucent and each of the respective plural types of particles being charged with the same polarity, differing in optical properties, and differing in either in migration speed and/or electric field threshold value for moving, a translucent display-side electrode provided at the substrate side where the translucent substrate is disposed, a first back-side electrode provided at the side of the other substrate, facing the display-side electrode, and a second back-side electrode provided at the side of the other substrate, facing the display-side electrode; and a voltage control section that controls the voltages applied to the display-side electrode, the first back-side electrode, and the second back-side electrode, such that the types of particles having the fastest migration speed from the plural types of particles, or the types of particles having the lowest threshold value from the plural types of particles, are moved, in sequence by each of the different types of particles, to the first back-side electrode or to the second back-side electrode, and then the particles that moved to the first back-side electrode are moved to the display-side electrode. U S. Patent Applications Publication Nos. 2011/0175939; 2011/0298835; 2012/0327504; and 2012/0139966 describe color displays which rely upon aggregation of multiple particles and threshold voltages. U S. Patent Application Publication No. 2013/0222884 describes an electrophoretic particle, which contains a colored particle containing a charged group-containing polymer and a coloring agent, and a branched silicone-based polymer being attached to the colored particle and containing, as copolymerization components, a reactive monomer and at least one monomer selected from a specific group of monomers. U S. Patent Application Publication No. 2013/0222885 describes a dispersion liquid for an electrophoretic display containing a dispersion medium, a colored electrophoretic particle group dispersed in the dispersion medium and migrates in an electric field, a non-electrophoretic particle group which does not migrate and has a color different from that of the electrophoretic particle group, and a compound having a neutral polar group and a hydrophobic group, which is contained in the dispersion medium in a ratio of about 0.01 to about 1 mass % based on the entire dispersion liquid. U.S. Patent Application Publication No. 2013/0222886 describes a dispersion liquid for a display including floating particles containing: core particles including a colorant and a hydrophilic resin; and a shell covering a surface of each of the core particles and containing a hydrophobic resin with a difference in a solubility parameter of 7.95 $(J/cm^3)^{1/2}$ or more. U.S. Patent Applications Publication Nos. 2013/0222887 and 2013/0222888 describe an electrophoretic particle having specified chemical compositions. Finally, U.S. Patent Application Publication No. 2014/0104675 describes a particle dispersion including first and second colored particles that move in response to an electric field, and a dispersion medium, the second colored particles having a larger diameter than the first colored particles and the same charging characteristic as a charging characteristic of the first color particles, and in which the ratio (Cs/Cl) of the charge amount Cs of the first colored particles to the charge amount Cl of the second colored particles per unit area of the display is less than or equal to 5. Some of the aforementioned displays do provide full color but at the cost of requiring addressing methods that are long and cumbersome.

U S. Patent Applications Publication Nos. 2012/0314273 and 2014/0002889 describe an electrophoresis device including a plurality of first and second electrophoretic particles included in an insulating liquid, the first and second particles having different charging characteristics that are different from each other; the device further comprising a porous layer included in the insulating liquid and formed of a fibrous structure. These patent applications are not full color displays in the sense in which that term is used below.

See also U.S. Patent Application Publication No. 2011/0134506 and U.S. Pat. No. 9,697,778 the latter describes a full color display using three different types of particles in a colored fluid, but the presence of the colored fluid limits the quality of the white state which can be achieved by the display.

In summary, the current state of the art is that full color displays typically involve compromises such as slow switching speeds (as long as several seconds), high addressing voltages or compromises on color quality. Thus, there is a need for improved full color electrophoretic displays.

SUMMARY OF INVENTION

In a first aspect, there is provided a novel electrophoretic medium comprising: a fluid; a plurality of light scattering charged particles having a first polarity; and a first, second, and third set of charged particles, each set having a color different from each other set, wherein the first and second particles have a second polarity opposite to the first polarity, and the third particles are composite particles comprising a core pigment and a polymer shell, wherein: (a) a mass fraction of the polymer shell to the composite particle is at least 20 wt % to at most 50 wt %; and (b) the polymer shell comprises. (I) a first monomeric unit derived from a first precursor of formula (1):

$$CH_2=C(R^{1a})C(O)R^2 \quad (1)$$

wherein: $R^{1a}$ is —H or —$CH_3$; $R^2$ is —$OR^3$, —$NHR^3$, or —$NR^3_2$; $R^3$ is $C_{1-6}$ alkyl, $C_{1-6}$ heteroalkyl, $C_{3-10}$ cycloalkyl, $C_{3-10}$ heterocycloalkyl, $C_{6-14}$ aryl, $C_{5-14}$ heteroaryl, or any combination thereof, each of which is optionally substituted one more times by groups selected independently from $R^4$; $R^4$ is a $C_{1-6}$ alkyl, —OH, $C_{1-6}$ alkoxy, —$NH_2$, —$NH(C_{1-6}$ alkyl), —$N(C_{1-6}$ alkyl)$_2$, $C_{1-6}$ haloalkyl, or $C_{1-6}$ haloalkoxy; (II) a second monomeric unit derived from a second precursor of Formula (2):

$$CH_2=C(R^{1b})C(O)R^5 \quad (2)$$

wherein: $R^{1b}$ is —H or —$CH_3$, $R^5$ is —$OR^6$, —$NHR^6$, or —$NR^6_2$, $R^6$ is $C_{1-6}$ alkyl, $C_{1-6}$ heteroalkyl, $C_{3-10}$ cycloalkyl, $C_{3-10}$ heterocycloalkyl, $C_{6-14}$ aryl, $C_{5-14}$ heteroaryl, or any combination thereof, each of which is substituted one or more times by groups selected independently from $R^7$; $R^7$ is a halogen, —CN, —$NO_2$, —S(O)—, or —$S(O)_2$—. In one embodiment, $R^3$ is $C_{1-6}$ alkyl, $C_{6-14}$ aryl, or any combination thereof, each of which is optionally substituted one or more times by groups selected independently from $R^4$; and $R^4$ is a $C_{1-6}$ alkyl, or $C_{1-4}$ alkoxy. In another embodiment, $R^2$ is —$OR^3$, and $R^3$ is $C_{1-6}$ alkyl or $C_{6-14}$ aryl, the $C_{6-14}$ aryl optionally substituted one or more times by groups selected independently from $R^4$; and $R^4$ is $C_{1-6}$ alkoxy. In a further embodiment, $R^6$ is $C_{1-6}$ alkyl and $R^7$ is a halogen. Also provided is an embodiment wherein $R^5$ is —$OR^6$, $R^6$ is $C_{1-6}$ alkyl substituted at least three times by $R^7$, and $R^7$ is —F. The first precursor may be selected from the group consisting of methyl methacrylate, methoxyphenyl methacrylate, and N,N-di-isopropylacrylamide. The second precursor may be trifluoroethyl methacrylate (TFEM). In the third particles a mass fraction of the polymer shell to the composite particle may be at least 25 wt % to at most 40 wt % The mass fraction of the polymer shell to the composite particle may be measured by thermogravimetric analysis (TGA). The fluid may be a liquid having a dielectric constant less than or equal to 5. The electrophoretic medium may further comprise a charge control agent. Each color of the first, second, and third set of charged particles may be independently selected from the group consisting of red, green, blue, magenta, cyan, and yellow. At least two of the first, second, and third charged particles may be non-light-scattering. In one embodiment, the light scattering charged particles are white and the first, second, and third sets of particles are non-light-scattering. In a further embodiment, the light scattering charged particles are negatively charged and the first and second sets of particles are positively charged. The fluid may have dissolved or dispersed therein a polymer that has a number average molecular weight in excess of about 20,000 and is essentially non-absorbing on the particles.

In a second aspect, there is provided an electrophoretic medium comprising: a fluid; a plurality of light scattering charged particles having a first polarity; and a first, second, and third set of charged particles, each set having a color different from each other set, wherein the first and second particles have a second polarity opposite to the first polarity, and the magnitude of the electrophoretic mobility of the third set of particles is less than half of the magnitude of the electrophoretic mobility of the light scattering particles, the first set of charged particles, and the second set of charged particles. The fluid may be a liquid having a dielectric constant less than or equal to 5. The electrophoretic medium may further comprise a charge control agent. Electrophoretic mobility may be measured from particle zeta potentials. In one embodiment, the third set of particles has a zeta potential greater than or equal to −20 mV and less than or equal to 20 mV. Electrophoretic mobility may also be measured from particle charge-to-mass ratios or from particle dispersion conductivity measurements. In one embodiment, each color of the first, second, and third set of charged particles is independently selected from the group consisting of red, green, blue, magenta, cyan, and yellow. At least two of the first, second, and third charged particles may be non-light-scattering. For example, the light scattering charged particles may be white and the first, second, and third sets of particles may be non-light-scattering. In one non-limiting embodiment, the light scattering charged particles are negatively charged and the first and second sets of particles are positively charged. The fluid may have dissolved or dispersed therein a polymer that has a number average molecular weight in excess of about 20,000 and is essentially non-absorbing on the particles.

In a third aspect, there is provide an electrophoretic medium comprising, a fluid; a plurality of light scattering charged particles having a first polarity; and a first, second, and third set of charged particles, each set having a color different from each other set, wherein the first and second particles have a second polarity opposite to the first polarity, and the third particles are composite particles comprising a core pigment and a polymer shell, wherein, (a) a mass fraction of the polymer shell to the composite particle is at least 20 wt % to at most 50 wt %; and (b) the polymer shell comprises: (I) a first monomeric unit derived from a first precursor of Formula (1):

$$CH_2=C(R^{1a})C(O)R^2 \quad (1)$$

wherein. $R^{1a}$ is —H or —$CH_3$; $R^2$ is —$OR^3$, —$NHR^3$, or —$NR^3_2$; $R^3$ is $C_{10}$ alkyl, $C_{10}$ heteroalkyl, $C_{3-10}$ cycloalkyl, $C_{3-10}$ heterocycloalkyl, $C_{6-14}$ aryl, $C_{5-14}$ heteroaryl, or any combination thereof, each of which is optionally substituted one more times by groups selected independently from $R^4$; $R^4$ is a $C_{1-6}$ alkyl, —OH, $C_{1-6}$ alkoxy, —$NH_2$, —$NH(C_{1-6}$ alkyl), —$(C_{1-6}$ alkyl)$_2$, $C_{1-6}$ haloalkyl, or $C_{1-6}$ haloalkoxy; (II) a second monomeric unit derived from a styrene optionally substituted one or more times by groups selected independently from $C_{1-6}$ alkyl, $C_{1-6}$ alkoxy, —$NH(C_{1-6}$ alkyl), —$N(C_{1-6}$ alkyl)$_2$, and halogen. In one embodiment, $R^3$ is $C_{1-6}$ alkyl, $C_{6-14}$ aryl, or any combination thereof, each of which is optionally substituted one or more times by groups selected independently from $R^4$; and $R^4$ is a $C_{1-6}$ alkyl, or $C_{1-6}$ alkoxy. In another embodiment, $R^2$ is —$OR^3$, and $R^3$ is $C_{1-6}$ alkyl or $C_{6-14}$ aryl, the $C_{6-14}$ aryl optionally substituted one or more times by groups selected independently from $R^4$; and $R^4$ is $C_{1-6}$ alkoxy. In the third particles a mass fraction of the polymer shell to the composite particle is at least at least 25 wt % to at most 40 wt %. The mass fraction of the polymer shell to the composite particle may be measured by thermogravimetric analysis (TGA). The fluid may be a liquid having a dielectric constant less than or equal to 5. The electrophoretic medium may further comprise a charge control agent. Each color of the first, second, and third set of charged particles is independently selected from the group consisting of red, green, blue, magenta, cyan, and yellow. At least two of the first, second, and third charged particles may be non-light-scattering. In one embodiment, the light scattering charged particles are white and the first, second, and third sets of particles are non-light-scattering. In another, non-limiting embodiment, the light scattering charged particles are negatively charged and the first and second sets of particles are positively charged. The fluid may have dissolved or dispersed therein a polymer that has a number average molecular weight in excess of about 20,000 and is essentially non-absorbing on the particles.

The electrophoretic media of the present invention may be in any of the forms discussed above. Thus, an electrophoretic medium may be unencapsulated, encapsulated in discrete capsules surrounded by capsule walls, or in the form of a polymer-dispersed or microcell medium.

This invention extends to a front plane laminate, double release sheet, inverted front plane laminate or electrophoretic display comprising an electrophoretic medium of the present invention. The displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

These and other aspects of the present invention will be apparent in view of the following description.

BRIEF DESCRIPTION OF DRAWINGS

FIG. 9 includes Table 2.

DEFINITIONS

Figure 1:
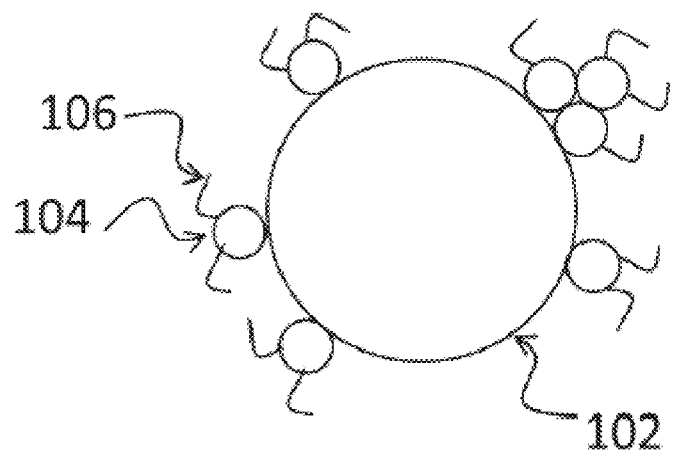
FIG. 1 is a schematic view of a pigment particle having a copolymer attached to its surface.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

The term "polymer" as used herein refers to a polymeric compound prepared by polymerizing monomers, whether of the same or of two or more types. The generic name polymer is therefore intended to encompass the term "homopolymer" and the term "interpolymer" as defined herein below. Trace amounts of impurities can be incorporated into and/or within the polymer structure.

The term "interpolymer" as used herein refers to a polymer prepared by the polymerization of at least two different monomers. The generic name interpolymer includes copolymers (used to refer to polymers prepared from two different types of monomers) and polymers prepared from more than two different types of monomers. Hence, a "polymer derived from one or more monomers" refers to a homopolymer when the monomer is one, a copolymer when the monomers are two, and other types of interpolymers in instances where the monomers are three or more.

The term "monomeric unit, "monomer unit", "monomer residue", or "monomeric residue" is understood to mean the residue resulting from the polymerization of the corresponding monomer. For example, a polymer derived from the polymerization of styrene monomers will provide polymeric segments comprising repeat styrenic monomeric units, i.e., "—$CH(C_6H_5)CH_2$—."

The term "functional group" as used herein refers to a linked collection of atoms or a single atom within a molecular entity, where a molecular entity is any constitutionally or isotopically distinct atom, molecule, ion, ion pair, radical, radical ion, complex, conformer etc., identifiable as a separately distinguishable entity. Unless stated otherwise, the description of a group as being "formed by" a particular chemical transformation does not imply that this chemical transformation is involved in making the molecular entity that includes the group.

As used herein, the various functional groups represented will be understood to have a point of attachment at the functional group having the hyphen or dash (-) or an asterisk (*). In other words, in the case of —$CH_2CH_2CH_3$, it will be understood that the point of attachment is the $CH_2$ group at the far left. If a group is recited without an asterisk or a dash, then the attachment point is indicated by the plain and ordinary meaning of the recited group.

As used herein, multi-atom bivalent functional groups are to be read from left to right. For example, if the specification or claims recite A-D-E and D is defined as —OC(O)—, the resulting group with D replaced is. A-OC(O)-E and not A-C(O)O-E.

The term "alkyl" as used herein refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. The number carbon atoms in an alkyl group is represented by the phrase "$C_{x-y}$ alkyl," which refers to an alkyl group, as herein defined, containing from x to y, inclusive, carbon atoms. Thus, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. In some instances, the "alkyl" group can be divalent, in which case the group may alternatively be referred to as an "alkylene" group. Also, in some instances, one or more of the carbon atoms in the alkyl or alkylene group can be replaced by a heteroatom (e.g., selected from nitrogen, oxygen, or sulfur, including N-oxides, sulfur oxides, and sulfur dioxides, where feasible), and is referred to as a "heteroalkyl" or "heteroalkylene" group.

As used herein, "cycloalkyl" refers to a 3- to 24-membered, cyclic hydrocarbon ring, which may be optionally substituted as herein further described, with multiple degrees of substitution being allowed. Such "cycloalkyl" groups are monocyclic or polycyclic. The term "cycloalkyl," as used herein, does not include ring systems that contain aromatic rings, but does include ring systems that can have one or more degrees of unsaturation. Examples of "cycloalkyl" groups, as used herein, include, but are not limited to, cyclopropyl, cyclobutyl, cyclopentyl, cyclohexyl, cycloheptyl, 1-norbornyl, 2-norbornyl, 7-norbornyl, 1-adamantyl, and 2-adamantyl. In some instances, the "cycloalkyl" group can be divalent, in which case the group can alternatively be referred to as a "cycloalkylene" group. Also, in some instances, one or more of the carbon atoms in the cycloalkyl or cycloalkylene group can be replaced by a heteroatom (e.g., selected from nitrogen, oxygen, or sulfur, including N-oxides, sulfur oxides, and sulfur dioxides, where feasible), and is referred to as a "heterocycloalkyl" or "heterocycloalkylene" group.

As used herein, "aryl" refers to a 6- to 30-membered cyclic, aromatic hydrocarbon, which may be optionally substituted as herein further described, with multiple degrees of substitution being allowed. Examples of "aryl" groups as used herein include, but are not limited to, phenyl and naphthyl. As used herein, the term "aryl" also includes ring systems in which a phenyl or naphthyl group is optionally fused with one to three non-aromatic, saturated or unsaturated, carbocyclic rings. For example, "aryl" would include ring systems such as indene, with attachment possible to either the aromatic or the non-aromatic ring(s). In some instances, the "aryl" group can be divalent, in which case the group can alternatively be referred to as an "arylene" group. Also, as used herein, "arylalkyl" refers to an alkyl substituent (as defined above), which is further substituted by one or more (e.g., one to three) aryl groups (as herein defined). Analogously, "alkylaryl" refers to an aryl substituent, which is further substituted by one or more (e.g., one to five) alkyl groups.

As used herein, the term "heteroaryl" refers to a 5- to 30-membered mono- or polycyclic ring system, which contains at least one aromatic ring and also contains one or more heteroatoms. Such "heteroaryl" groups may be optionally substituted as herein further described, with multiple degrees of substitution being allowed. In a polycyclic "heteroaryl" group that contains at least one aromatic ring and at least one non-aromatic ring, the aromatic ring(s) need not contain a heteroatom. Thus, for example, "heteroaryl," as used herein, would include indolinyl. Further, the point of attachment may be to any ring within the ring system without regard to whether the ring containing the attachment point is aromatic or contains a heteroatom. Thus, for example, "heteroaryl," as used herein, would include indolin-1-yl, indolin-3-yl, and indolin-5-yl. Examples of heteroatoms include nitrogen, oxygen, or sulfur atoms, including N-oxides, sulfur oxides, and sulfur dioxides, where feasible. Examples of "heteroaryl" groups, as used herein include, but are not limited to, furyl, thiophenyl, pyrrolyl, oxazolyl, thiazolyl, imidazolyl, isoxazolyl, isothiazolyl, 1,2,4-triazolyl, pyrazolyl, pyridinyl, pyridazinyl, pyrimidinyl, indolyl, isoindolyl, benzo[b]thiophenyl, benzimidazolyl, benzothiazolyl, pteridinyl, and phenazinyl, where attachment can occur at any point on said rings, as long as attachment is chemically feasible. Thus, for example, "thiazolyl" refers to thiazol-2-yl, thiazol-4-yl, and thiaz-5-yl. In some instances, the "heteroaryl" group can be divalent, in which case the group can alternatively be referred to as a "heteroarylene" group. Also, as used herein, "heteroarylalkyl" refers to an alkyl substituent (as defined above), which is further substituted by one or more (e.g., one to three) heteroaryl groups (as herein defined). Analogously, "alkylheteroaryl" refers to an aryl substituent, which is further substituted by one or more (e.g., one to five) alkyl groups.

As used herein, "alkoxy" refers to —OR, where R is an alkyl group (as defined above). The number carbon atoms in an alkyl group is represented by the phrase "Cx-y alkoxy," which refers to an alkoxy group having an alkyl group, as herein defined, containing from x to y, inclusive, carbon atoms.

As used herein, "halogen" or "halo" refers to fluorine, chlorine, bromine, and/or iodine. In some embodiments, the terms refer to fluorine and/or chlorine. As used herein, "haloalkyl" or "haloalkoxy" refer to alkyl or alkoxy groups, respectively, substituted by one or more halogen atoms. The terms "perfluoroalkyl" or "perfluoroalkoxy" refer to alkyl groups and alkoxy groups, respectively, where every available hydrogen is replaced by fluorine.

In some instances, the disclosure may refer to a "combination" or "combinations" of certain groups, which means that two or more of the preceding groups can combine to form a new group. For example, the phrase "R is alkylene, arylene, or combinations thereof" means that R can be a group that contains both alkykene and arylene groups, such as -(alkylene)-(arylene)-, -(arylene)-(alkylene)-, -(alkylene)(arylene)(alkylene)-, and the like.

As used herein, "substituted" refers to substitution of one or more hydrogens of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week, or a compound which maintains its integrity long enough to be useful for electrophoretic applications. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., A1 and A2, then one or more members of the class can be present concurrently.

As used herein, "wt %" is an abbreviation for the percentage by mass of a given component of an item. It is one way of expressing the composition of a mixture or product in a dimensionless size; mole fraction (percentage by moles, mol %) and volume fraction (percentage by volume, vol %) are others.

DETAILED DESCRIPTION

As indicated above, the present invention provides, in one aspect, an electrophoretic medium which comprises one light-scattering particle (typically white) and three other particles, typically providing three subtractive primary colors. Improved switching times are achieved without sacrificing total color gamut when one of the three subtractive primary colored particles has a mobility (for example, as measured in terms of zeta potential) that is less than or equal to half of the mobility of the other particles in the electrophoretic medium.

The three particles providing the three subtractive primary colors may be substantially non-light-scattering ("SNLS"). The use of SNLS particles allows mixing of colors and provides for more color outcomes than can be achieved with the same number of scattering particles. The aforementioned US 2012/0327504 uses particles having subtractive primary colors, but requires two different voltage thresholds for independent addressing of the non-white particles (i.e., the display is addressed with three positive and three negative voltages). These thresholds must be sufficiently separated for avoidance of cross-talk, and this separation necessitates the use of high addressing voltages for some colors. In addition, addressing the colored particle with the highest threshold also moves all the other colored particles, and these other particles must subsequently be switched to their desired positions at lower voltages. Such a step-wise color-addressing scheme produces flashing of unwanted colors and a long transition time. Certain embodiments of the present invention do not require the use of a such a stepwise waveform and addressing to all colors can be achieved with only two positive and two negative voltages (i.e., only five different voltages, two positive, two negative and zero are required in a display, although in other embodiments it may be preferred to use more different voltages to address the display).

Figures 7, 8:
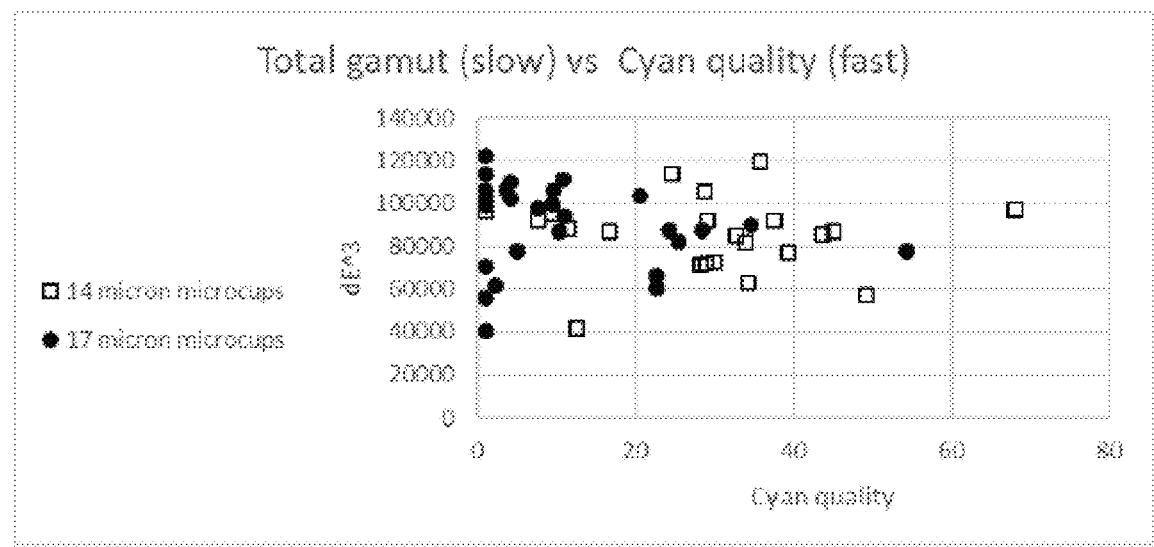
FIG. 7 is a graph showing the cyan quality obtained by application of the waveform of FIG. 3 vs. the total gamut obtained by application of the waveform of FIG. 4 for the displays made according to various embodiments of the present invention.
FIG. 8 is a schematic cross-section showing the positions of the various particles in an electrophoretic medium when displaying black, white, the three subtractive primary and the three additive primary colors.

FIG. 8 of the accompanying drawings is a schematic cross-section showing the positions of various particles in an electrophoretic medium of a color display as described in U.S. Pat. No. 9,921,451 when displaying black, white, the three subtractive primary and the three additive primary colors. In FIG. 8, it is assumed that the viewing surface of the display is at the top (as illustrated), i.e., a user views the display from this direction, and light is incident from this direction. As already noted, in preferred embodiments only one of the four particles used in the electrophoretic medium of the present invention substantially scatters light, and in FIG. 8 this particle is assumed to be the white pigment. Basically, this light-scattering white particle forms a white reflector against which any particles above the white particles (as illustrated in FIG. 8) are viewed. Light entering the viewing surface of the display passes through these particles, is reflected from the white particles, passes back through these particles and emerges from the display. Thus, the particles above the white particles may absorb various colors and the color appearing to the user is that resulting from the combination of particles above the white particles. Any particles disposed below (behind from the user's point of view) the white particles are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 8), there are no particles above the white particles and the pixel simply displays a white color. When a single particle is above the white particles, the color of that single particle is displayed, yellow, magenta and cyan in Situations [B], [D] and [F] respectively in FIG. 8. When two particles lie above the white particles, the color displayed is a combination of those of these two particles; in FIG. 8, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 8), all the incoming light is absorbed by the three subtractive primary colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black).

It would not be easy to render the color black if more than one type of colored particle scattered light.

FIG. 8 shows an idealized situation in which the colors are uncontaminated (i.e., the light-scattering white particles completely mask any particles lying behind the white particles). In practice, the masking by the white particles may be imperfect so that there may be some small absorption of light by a particle that ideally would be completely masked. Such contamination typically reduces both the lightness and the chroma of the color being rendered. In the electrophoretic medium of the present invention, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above. (Hereinafter, "primary colors" will be used to refer to the eight colors, black, white, the three subtractive primaries and the three additive primaries as shown in FIG. 8.)

Methods for electrophoretically arranging a plurality of different colored particles in "layers" as shown in FIG. 8 have been described in the prior art. The simplest of such methods involves "racing" pigments having different electrophoretic mobilities; see for example U.S. Pat. No. 8,040, 594. Such a race is more complex than might at first be appreciated, since the motion of charged pigments itself changes the electric fields experienced locally within the electrophoretic fluid. For example, as positively-charged particles move towards the cathode and negatively-charged particles towards the anode, their charges screen the electric field experienced by charged particles midway between the two electrodes. It is thought that, while pigment racing is involved in the electrophoretic of the present invention, it is not the sole phenomenon responsible for the arrangements of particles illustrated in FIG. 8.

In a color display, such as those described in U.S. Pat. No. 9,921,451, one of the colored pigments has the same charge polarity as the white pigment (which is typically negatively charged). Both the negatively-charged colored pigment and the white pigment move in the same direction in an electric field, so production of pure white and yellow states requires some means to selectively retard or enhance the motion of one of these pigments relative to the other. In practice, complex waveforms are used to ensure that the white pigment overlies the negatively-chained colored pigment with respect to the viewer to such a degree than an uncontaminated white state is achieved. Such complex waveforms may not allow the production of a rapid transition from another color to the white state. For example for some displays, such a transition may be about 5-10 seconds long. In the case in which white and yellow are negatively-charged and cyan and magenta positively-charged, and in which the cyan pigment forms a weaker aggregate with yellow than the magenta pigment, the color cyan must be formed from a prior white state, followed by a second phase in which the cyan pigment is brought to the viewing surface, as described in U.S. Pat. No. 9,921,451. Thus, forming the color cyan from another color requires an even longer update time than forming the white state. In many applications of a full-color electrophoretic display, however, it would be preferred to have a much shorter image transition, on the order of three seconds or less.

As anticipated above, it has now been found that improved switching times may be possible when one of the three subtractive primary colored particles has a mobility that is less than or equal to half of the mobility of the other particles in the electrophoretic medium. In a broad sense, mobility may be expressed as $\mu = v/\vec{E}$ where $v$ is the electrophoretic velocity and $\vec{E}$ is the applied electric field. A measure of the colored particle mobility can be obtained in one of several ways. Though mobility can be measured directly, direct measurement may not be simple for non-polar media. For example, mobility can be calculated from a measured value of zeta potential, $\zeta$, or charge-to-mass ratio, Q/M, of the particles or from a measured value of the difference in conductivity of the dispersion, $\lambda$, and its serum, $\lambda_0$. The relationship of the mobility to zeta potential, charge-to-mass ratio, and conductivity is discussed in Morrison, I. D. and Tamawskyj, C. J., *Langmuir* 1991, 7, 2358.

In one example, the electrophoretic medium may comprise a solvent of low dielectric constant, a white pigment having a silane surface treatment and polymer coating, and zeta potential <−60 mV, a first colored pigment comprising a polymer coating and having a zeta potential >30 mV, a second colored pigment that may or may not comprise a polymer coating, having a zeta potential >20 mV, the polymer coating providing less steric stabilization than the polymer coatings on the first and third colored pigments, and a third colored particle having a zeta potential in the range −20 mV to +20 mV. More generally, formulations according to various embodiments of the present invention may comprise a scattering, white pigment comprising a polymer coating and having a first polarity, two colored pigments having a second polarity that is opposite to the first polarity, at least one of these two pigments having a polymer coating, and a third colored pigment comprising a polymer coating, wherein the mobility of the third colored pigment is less than half the mobility of any other of the pigments. The polymer coating of the third colored pigment is preferably insoluble in the electrophoretic solvent, but may be removed by more polar solvents. In some formulations, the white pigment, the two colored pigment having a second polarity, and the third colored pigment all comprise a polymer coating. Each coating may be of a composition different from all the other coatings. Alternatively, two or more of the pigment may feature the same coating.

Assuming that the core pigments comprising the particles are approximately the same size, and the zeta potential of each uncoated particle is assumed to be approximately the same, the magnitude of the zeta potential for the composite particles is dependent on the polymer shell surrounding each core pigment. According to one method for making pigment particles included in the electrophoretic media according to the various embodiments of the present invention, dispersion polymerization procedures may be used for providing a polymer coating on a core pigment particle. In a preferred method, a dispersion of core pigment particles is provided in a solution of appropriate monomers in a solvent that also contains a polymerization initiator. The homopolymer formed from at least one of the monomers is soluble in the solvent, whereas the homopolymer formed from at least another of the monomers is insoluble at a sufficiently high molecular weight. The deposition of the polymer onto the core pigment particles begins when a copolymer is produced as the polymerization of the mixture of monomers proceeds, becoming insoluble in the solvent as its molecular weight increases. A sufficient amount of the more soluble monomer is present, however, to provide portions of the copolymer that are soluble in the solvent. These segments provide steric stabilization to the coated core pigment particles.

A schematic illustration of a polymer coated pigment particle is provided in FIG. 1. A core pigment particle 102 is decorated with smaller polymer particles 104 that contain segments 106 that are soluble in the solvent. As more polymer particles are deposited onto the core particle its surface becomes progressively covered up. Without wishing to be bound by theory, a simple model of this process will now be described. Many assumptions are made in this model; however, the model has some value in assisting in the understanding of the various embodiments of the present invention.

If it is assumed that the polymer particles 104 accrete onto the surface of the already decorated pigment particle 102 at random positions, and that polymer particles, once adhered, do not spread on the surface of the particle, then the probability of an additional polymer particle striking a part of the core pigment particle 102 that has not already been covered with polymer depends upon the amount of polymer already present. This gives rise to an expression for the proportion P of the surface of the pigment particle covered by polymer of the type:

$$P = 1 - \exp(-kQ) \tag{1}$$

where Q is the relative mass of the added polymer particles to the pigment particles and k is a constant that depends upon the radii of the polymer and pigment particles and their relative densities.

If a further assumption is made that the zeta potential of the decorated particle is the surface-area averaged zeta potential of the uncovered pigment surface and the polymer, and that the zeta potential of the polymer is the mass-ratio average of the zeta potentials of pure polymers made from each constituent monomer, then the zeta potential of the composite particle is given by.

$$\zeta = \zeta_{pig} e^{-kQ} + (1 - e^{-kQ}) \frac{\sum_i m_i \zeta_i}{\sum_i m_i} \tag{2}$$

where $m_i$ is the relative mass of monomer i in the polymer that comprises the polymer particles, $\zeta_i$ is the zeta potential of a particle made from the pure polymer made from monomer i, and $\zeta_{pig}$ is the zeta potential of the undecorated pigment particle. Equation (2) allows for a rough prediction of the zeta potential of a particular composite particle given its composition.

Figure 2:
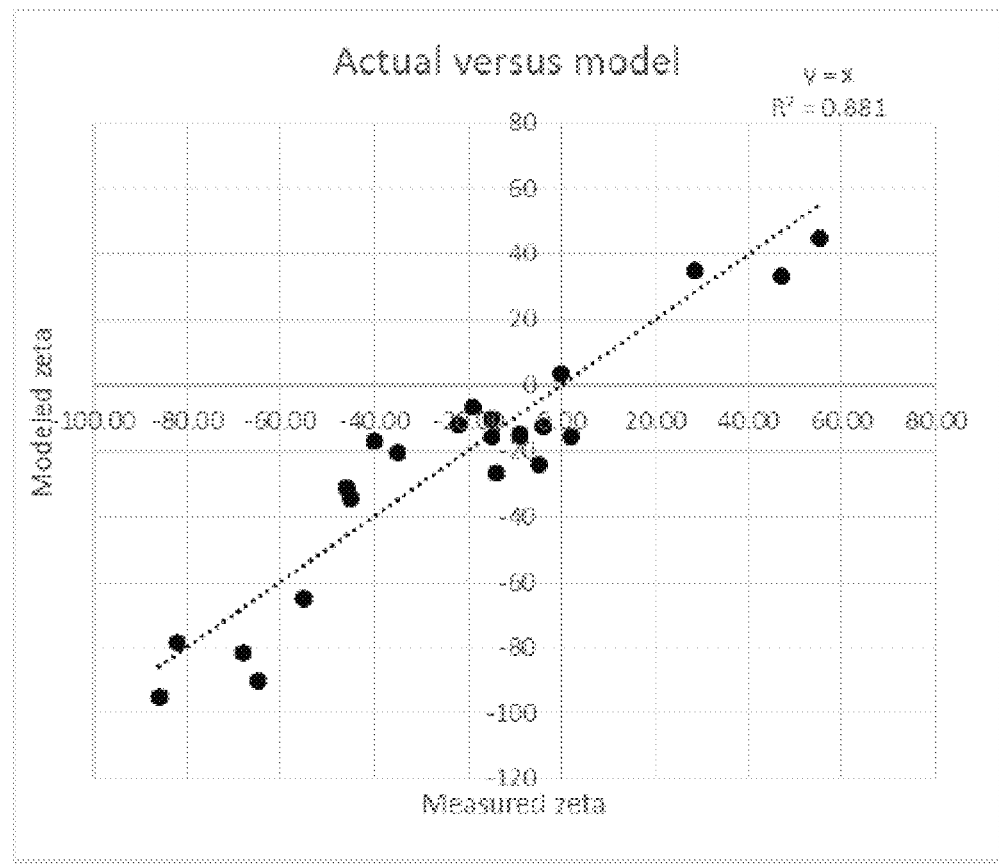
FIG. 2 is a graph of the predicted and measured zeta potentials for a number of different composite pigment particles according to various embodiments of the present invention.

FIG. 2 shows a comparison between the predicted and measured zeta potentials for a number of different composite pigment particles of the invention, all of which are derivatives of the same fundamental pigment particle (Pigment Yellow 155). Note that in the preparation of pigment particles (such as the embodiments described in detail in Example 1 below) only about one third of the mass of monomers added to the polymerization reaction is actually deposited onto the surface of isolated pigment particles. As a result, the composition of the deposited polymer is not necessarily the same as the composition of monomers added to the reaction vessel. The zeta potential estimated by equation (2) is therefore only an approximation.

Typically, monomers used to prepare particles incorporated into the electrophoretic media according to the various embodiments of the present invention should be soluble in the polymerization solvent. At least one of the monomers should form a polymer that becomes insoluble as the polymerization proceeds.

Monomers that impart a more positive charge to the product polymer include esters and amides of vinylic acids, such as those of Formula (1).

$$CH_2 = C(R^{1a})C(O)R^2 \qquad \text{Formula (1)}$$

Functional group $R^{1a}$ is usually —H or —CH$_3$. In one embodiment, group $R^2$ is of formula —OR$^3$, forming acrylates or methacrylates. When group $R^2$ is of formula —NHR$^3$, the monomer is an acrylamide. Also included is an embodiment where $R^2$ is of formula —NR$^3{}_2$ in which case the monomer is an N,N-diacrylamide. In non-limiting embodiments, group $R^3$ may be one or a combination of $C_{1-6}$ alkyl, $C_{1-6}$ heteroalkyl, $C_{3-10}$ cycloalkyl, $C_{3-10}$ heterocycloalkyl, $C_{1-6}$ aryl, $C_{5-14}$ heteroaryl. In addition, group $R^3$ may be substituted one more times by groups selected independently from $R^4$. In a representative embodiment, $R^4$ may be $R^4$ is a $C_1$-6 alkyl, —OH, $C_{1-6}$ alkoxy, —NH$_2$, —NH($C_{1-4}$ alkyl), —N($C_{1-4}$ alkyl)$_2$, $C_{1-4}$ haloalkyl, or $C_{1-4}$ haloalkoxy. Representative individual monomers of Formula (1) include methyl methacrylate (MMA), methoxyphenylmethyl methacrylate, and N,N-di-isopropylacrylamide.

Monomers that impart a more negative charge include styrene and substituted styrenes. Non-limiting examples of substituted styrenes include those substituted one or more times by groups selected independently from $C_{1-4}$ alkyl, $C_{1-4}$ alkoxy, —NH($C_{1-4}$ alkyl), —N($C_{1-4}$ alkyl)$_2$, and halogen. Another class of monomers importing a more negative charge are provided by the molecules of Formula (2):

$$CH_2 = C(R^{1b})C(O)R^5 \qquad \text{Formula (2)}$$

Functional group $R^{1b}$ is usually —H or —CH$_3$. In one embodiment, group $R^5$ is of formula —OR$^6$, forming acrylates or methacrylates. When group $R^5$ is of formula —NHR$^6$, the monomer is an acrylamide. Also included is an embodiment where $R^5$ is of formula —NR$^6{}_2$ rendering the monomer an N,N-diacrylamide. In non-limiting embodiments, group $R^6$ may be one or a combination of $C_{1-4}$ alkyl, $C_{1-4}$ heteroalkyl, $C_{3-10}$ cycloalkyl, $C_3$-m heterocycloalkyl, $C_{6-14}$ aryl, $C_{5-14}$ heteroaryl. In addition, group $R^6$ is substituted one more times by groups selected independently from $R^7$. In representative embodiments, $R^7$ is a halogen, —CN, —NO$_2$, —S(O)—, or —S(O)$_2$—. Representative individual monomers of Formula (2) include fluorinated or partially fluorinated esters of vinylic acids, such as acrylates or methacrylates of trifluoromethyl, difluoromethyl, monofluoromethyl, pentafluoroethyl, tetrafluoroethyl, trifluoroethyl, difluoroethyl, monofluoroethyl. In one exemplary embodiment, the monomer of Formula (2) is trifluoroethyl methacrylate (TFEM).

The monomer providing a soluble homopolymer may be a derivative of polydimethylsiloxane (PDMS), for example an acrylate-terminated polydimethyl siloxane, or a long-chain or branched-chain acrylate ester such as lauryl methacrylate or 2-ethylhex-1-ylmethacrylate.

As mentioned above, in a preferred embodiment of the present invention, one set of composite particles in the electrophoretic medium have a zeta potential in the range −20 mV to +20 mV. As is well known in the art, a population of pigment particles will generally exhibit a range of mobilities depending on the distribution of particles within the population. Therefore, zeta potential values represent an average value of the mobility of the overall set of particles.

The extent of the polymer shell is conveniently assessed by thermal gravimetric analysis (TGA), a technique in which the temperature of a dried sample of the particles is raised and the mass loss due to pyrolysis is measured as a function of temperature. Conditions can be found in which the polymer coating is lost but the core pigment remains (these conditions depend upon the precise core pigment particle used). Using TGA, the proportion of the mass of the particle that is polymer, i.e., the mass fraction of polymer shell in the composite particle, can be measured, and this can be converted to a volume fraction using the known densities of the core pigments and the polymers attached to them.

The method of gravimetrically estimating the degree of polymer coverage of the pigment particles described above is also provided below in Example 2. This degree of coverage can be adjusted by varying the mass ratio of monomers and particles in the reaction mixture used to prepare the composite pigment particles. According to one exemplary embodiment, the mass fraction of the polymer shell in the composite particle is at least 25 wt % to at most 75 wt %. In further embodiments, the mass fraction is at least 25 wt % to at most 70 wt %, at least 25 wt % to at most 60 wt %, at least 25 wt % to at most 50 wt %, or at least 25 wt % to at most 40 wt % In further embodiments, the mass fraction is at least 20 wt % to at most 70 wt %, at least 20 wt % to at most 60 wt %, at least 20 wt % to at most 50 wt %, or at least 20 wt % to at most 40 wt %.

A wide variety of forms may be used for the core pigment: spherical, acicular or otherwise anisometric, aggregates of smaller particles (i.e., "grape clusters"), composite particles comprising small pigment particles or dyes dispersed in a binder, and so on as is well known in the art. The polymer shell may be a covalently-bonded polymer made by grafting processes or chemisorption as is well known in the art, or may be physisorbed onto the particle surface.

In this analysis it is assumed that the polymer shell evenly encapsulates the entire surface of the core pigment. However, this is by no means assured. (See, for example, the aforementioned U.S. Pat. No. 6,822,782, FIG. 6 and the related description at columns 16-17.) It may be that the method of attachment of the polymer favors one face of a crystalline core pigment over another, and there may be partial areas of the core pigment with polymer coverage and other areas with none or very little. Also, especially when grafting techniques are used to attach the polymer to the pigment surface, growth of the polymer may be patchy, leaving large areas of the core pigment uncovered even if the mass of grafted polymer is large.

As already mentioned, in one preferred embodiment the present invention requires the use of a light-scattering particle, typically white, and three substantially non-light-scattering particles. There is of course no such thing as a completely light-scattering particle or a completely non-light-scattering particle, and the minimum degree of light scattering of the light-scattering particle, and the maximum tolerable degree of light scattering tolerable in the substantially non-light-scattering particles, used in the electrophoretic of the present invention may vary somewhat depending upon factors such as the exact pigments used, their colors and the ability of the user or application to tolerate some deviation from ideal desired colors. The scattering and absorption characteristics of a pigment may be assessed by measurement of the diffuse reflectance of a sample of the pigment dispersed in an appropriate matrix or liquid against white and dark backgrounds. Results from such measurements can be interpreted according to a number of models that are well-known in the art, for example, the one-dimensional Kubelka-Munk treatment. In the present invention, it is preferred that the white pigment exhibit a diffuse reflectance at 550 nm, measured over a black background, of at least 5% when the pigment is approximately isotropically distributed at 15% by volume in a layer of thickness 1 μm comprising the pigment and a liquid of refractive index less than 1.55. The yellow, magenta and cyan pigments preferably exhibit diffuse reflectances at 650, 650 and 450 nm, respectively, measured over a black background, of less than 2.5% under the same conditions. (The wavelengths chosen above for measurement of the yellow, magenta and cyan pigments correspond to spectral regions of minimal absorption by these pigments.) Colored pigments meeting these criteria are hereinafter referred to as "non-scattering" or "substantially non-light-scattering".

Table 1 below shows the diffuse reflectance of preferred yellow, magenta, cyan and white pigments useful in electrophoretic media of the present invention (Y1, M1, C1 and W1, described in more detail below), together with the ratio of their absorption and scattering coefficients according to the Kubelka-Munk analysis of these materials as dispersed in a poly(isobutylene) matrix.

TABLE 1

| Color | Volume Fraction | Diffuse reflectance of 1 μm layer on 0% black | | | Ratio absorption/scatter | | |
|---|---|---|---|---|---|---|---|
| | | 450 nm | 550 nm | 650 nm | K/S 450 nm | K/S 550 nm | K/S 650 nm |
| Yellow (Y1) | 0.097 | 4.5% | 0.9% | 0.5% | 9.67 | 0.38 | 0.63 |
| Yellow (Y1) | 0.147 | 4.4% | 0.9% | 0.4% | 9.84 | 0.25 | 0.02 |
| Magenta (M1) | 0.115 | 2.8% | 3.8% | 0.7% | 10.01 | 10.85 | 1.27 |
| Magenta (M1) | 0.158 | 3.2% | 4.1% | 1.0% | 10.00 | 10.75 | 1.64 |
| Magenta (M1) | 0.190 | 3.4% | 4.1% | 1.3% | 10.09 | 10.80 | 1.03 |
| Cyan (C1) | 0.112 | 1.3% | 3.7% | 4.3% | 7.27 | 11.17 | 10.22 |
| Cyan (C1) | 0.157 | 1.5% | 3.8% | 4.3% | 7.41 | 11.30 | 10.37 |
| Cyan (C1) | 0.202 | 1.7% | 3.9% | 4.3% | 7.21 | 11.56 | 10.47 |
| White (W1) | 0.147 | 8.1% | 6.2% | 4.8% | 0.0015 | 0.0020 | 0.0026 |
| White (W1) | 0.279 | 24.9% | 20.6% | 17.0% | 0.0003 | 0.0003 | 0.0004 |
| White (W1) | 0.339 | 26.3% | 21.7% | 18.1% | 0.0001 | 0.0002 | 0.0002 |

The core pigment used in the white particle is typically a metal oxide of high refractive index as is well known in the art of electrophoretic displays, such as titania. The core pigments used to provide the three subtractive primary colors: cyan, magenta and yellow include, but are not limited to, the following.

Suitable yellow core pigments include C.I. Pigment Yellows 1, 3, 12, 13, 14, 16, 17, 73, 74, 81, 83, 97, 111, 120, 126, 137, 139, 150, 151, 155, 174, 175, 176, 180, 181, 191, 194, 213 and 214. Preferred yellow core pigments include C.I. Pigment Yellows 139, 155 and 180.

Suitable magenta core pigments include C.I. Pigment Reds 12, 14, 48:2, 48:3, 48:4, 57:1, 112, 122, 146, 147, 176, 184, 185, 209, 257 and 262, and C.I. Pigment Violets 19 and 32. One preferred magenta core pigment is C.I. Pigment Red 122.

Suitable cyan core pigments include C.I. Pigment Blues 15:1, 15:2, 15:3, 15:4 and 79, and C.I. Solvent Blue 70.

A display device may be constructed using an electrophoretic fluid of the invention in several ways that are known in the prior art. The electrophoretic fluid may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive.

EXAMPLES

Examples are now given, though by way of illustration only, to show details of preferred electrophoretic media of the present invention and processes for driving these preferred electrophoretic media.

Example 1—Preparation of Yellow Pigment

Step 1: Preparation of Millbase.
A holding tank was charged with a mixture of Pigment Yellow 155 (available as Ink Jet Yellow 4GC from Clariant Corporation, 1670 g) and isopar-E (9440 g). The mixture was circulated through a Lab Star horizontal agitator Bead Mill (Netzsch Premier Technologies) loaded with 0.7 to 1.2 mm spherical grinding media (ceria-stabilized zirconia, available from Jyoti, 1840 g). Milling was carried out with an agitator speed of 1000 rpm for a run time equivalent to 375 min/kg pigment.

Step 2: Polymerization.
A 250 ml polypropylene bottle was charged with a millbase prepared as described above (183.18 g, 25.04 g pigment content based upon assay of 13.67%), sonicated for 75 minutes, then transferred to a 500 mL 3-necked round-bottomed flask fitted with mechanical stirrer, rubber septum, and sub-surface nitrogen delivery tube. A wash with Isopar E (27 mL) was added. The suspension was stirred rapidly with nitrogen sparge for 15 minutes, at which point a mixture of mono-methacryloxypropyl-terminated poly(dimethylsiloxane) macromer, molecular weight about 10,000, available from Gelest as MCR-M22 (12.90 g), methyl methacrylate (8.40 g), and trifluoroethylmethacrylate (2.70 g) was added, along with an additional Isopar E wash (5 mL).

The mixture was stirred with continual nitrogen sparge and heating in an oil bath, attaining 55° C. after one hour. At this point the nitrogen delivery was changed to above surface, a thermometer was introduced into the flask, and a solution of azobisisobutyronitrile (92 mg) in ethyl acetate (0.72 g) was added by syringe. After another 75 minutes the batch temperature was 66° C. After another 15.5 hours the temperature was 63° C., and the heating bath was removed. Stirring was continued until the temperature had dropped to 40° C., at which point the batch was diluted with Isopar E (60 mL), and stirred with slow cooling to 33° C. At this point the contents were transferred to two 250 mL polypropylene bottles, along with sufficient Isopar E wash to bring to a total dispersion volume of 500 mL. The batch was centrifuged 30 minutes at 3500 rpm. A sample of the supernatant was reserved. The solids were suspended in Isopar E to a total volume of 250 mL and roll-milled for 4 hours, then centrifuged for 30 minutes at 3440 rpm. The supernatant was discarded, the solids resuspended in Isopar E to 250 mL total volume and again centrifuged 30 minutes. This process was repeated three more times (for a total of five centrifugations). The wet cake at the end of this process was suspended in hexane to 250 mL and centrifuged for 30 minutes at 3500 rpm. The solids were allowed to air-dry for 3 days, then placed in a vacuum oven at 50° C. for 24 hours to provide a yellow solid weighing 34.42 g.

Step 3: Dispersion of Composite Pigment.
To a 125 mL polypropylene bottle were added the dry pigment prepared as described above (10.00 g) and Isopar E (40.00 g). The mixture was bath sonicated for eight 90-minute periods over the course of six days, being rotated on a roll mill during the intervening times. The resulting dispersion was filtered through 200 micron fabric mesh to provide a mobile dispersion, and leaving no retained solids. A weighed sample was dried overnight at 170° F. in a convection oven, leaving 20.26% residual solids weight.

Example 2—Estimation of the Mass Fraction Relative to the Weight of the Composite Particles To a scintillation vial were added a pigment to be tested (0.5899 g), tetrahydrofuran (7.05 g) and a small magnetic stirring bar. The vial was capped and placed on a stirrer/hotplate and stirred with heating. A 250 mL glass jar was inverted over the vial to shield from drafts and to provide a safety shield if the vial should burst. The temperature of the hotplate was adjusted to give a batch temperature of 60° C. (measured periodically with a pyrometer). Heating was discontinued after two hours and the contents continued stirring for an additional two hours, then transferred to a 15 mL Nalgene centrifuge cone, along with ca. 2 mL of THE washes. The dispersion was centrifuged 30 minutes at 3070 rpm. The supernatant was transferred to a scintillation vial tared at 14.0412 g and left in a 170° F. convection oven overnight. The next day to the centrifugation sediment was added THE (6.5 g). The cone was capped, shaken, and sonicated to effect dispersion, then centrifuged 30 minutes at 3070 rpm. The supernatant was added to the vial containing the residue from the first supernatant, and this solution was again dried in a convection oven at 170° F. overnight. The sediment from centrifugation was air-dried overnight, then both components were dried in vacuo at 70° C. for 8 hours. Gross weight of the vial plus contents was 14.1873 g, representing 0.1461 g net polymer weight (24.77% of the original sample weight). The dried residual pigment in the centrifuge cone was transferred to a scintillation vial to give a net weight of 0.4532 g (76.83% of the weight of the original sample), and the mass balance is therefore 101.60%.

Table 2 (FIG. 9) shows the physical properties of the pigments prepared and analyzed as described in Examples 1 and 2 above. The particle diameters quoted are measured in solution, in which the polymer shells (if present) are swollen by the solvent.

Example 3—Measurement of the Electro-Optical Performance of Formulations

Step 1: Preparation of Exemplary Electrophoretic Fluid
Fluid (i): A white particle dispersion similar to that described in U.S. Pat. No. 9,921,451, example 12, Part A (15.53 g) was combined with a cyan particle dispersion similar to that prepared as described in the U.S. Pat. No. 9,921,451, example 7 (1.93 g), a magenta particle dispersion similarly to that prepared as described in U.S. Pat. No. 9,921,451, example 5 (2.29 g), a yellow pigment dispersion similar to that described in Example 1, Step 3 above (2.30 g), a surfactant similar to Solsperse 19000, available from Lubrizol Corporation, Wickliffe, Ohio, (1.16 g of a 50% w/w solution in Isopar E), and poly(isobutylene) of molecular weight 850,000 (1.06 g of a 15% w/w solution in Isopar E). The resultant mixture was mixed thoroughly overnight and sonicated for 90 minutes to produce an electrophoretic fluid.

Step 2: Preparation of a Display Device
An array of microcells embossed onto a polyethylene terephthalate) film with a coating of a transparent conductor (indium tin oxide, ITO) was filled with electrophoretic fluids prepared as described in Step 1, above. The microcells were hexagonal in shape, with 14 or 17 micrometer depth and 130 micrometer width measured from edge to edge. Excess electrophoretic fluid was removed from the microcells by a doctor blade, and they were sealed with a composite polymeric coating as described in U.S. Pat. No. 9,759,978. This assembly was laminated to a glass backplane with ITO electrodes using a doped thermal adhesive substantially as described in U.S. Pat. No. 7,012,735 of 3 μm in thickness to produce a display device.

Figure 3:
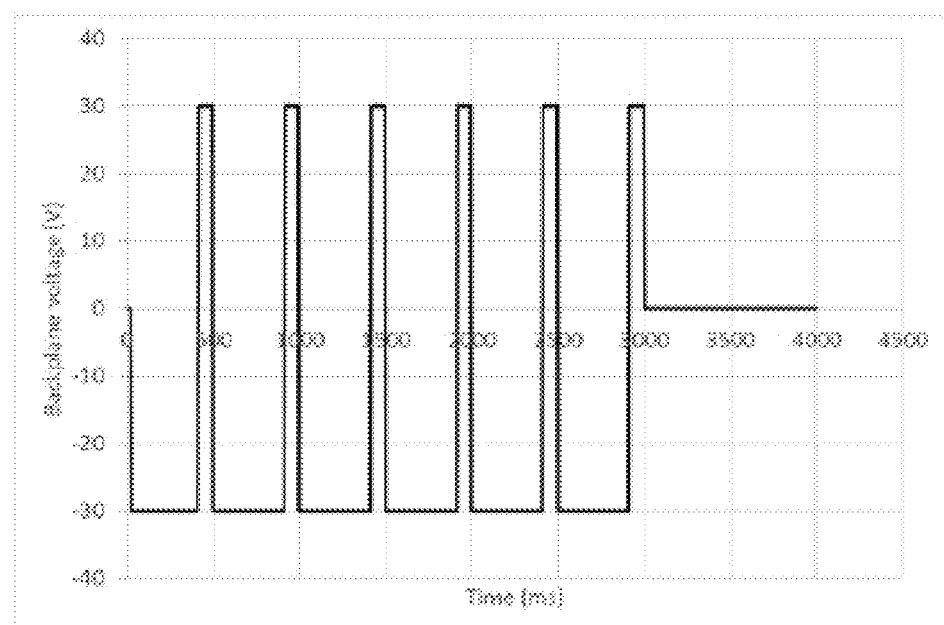
FIG. 3 shows a waveform used to drive display samples including dispersions according to various embodiments of the present invention.
Figure 4:
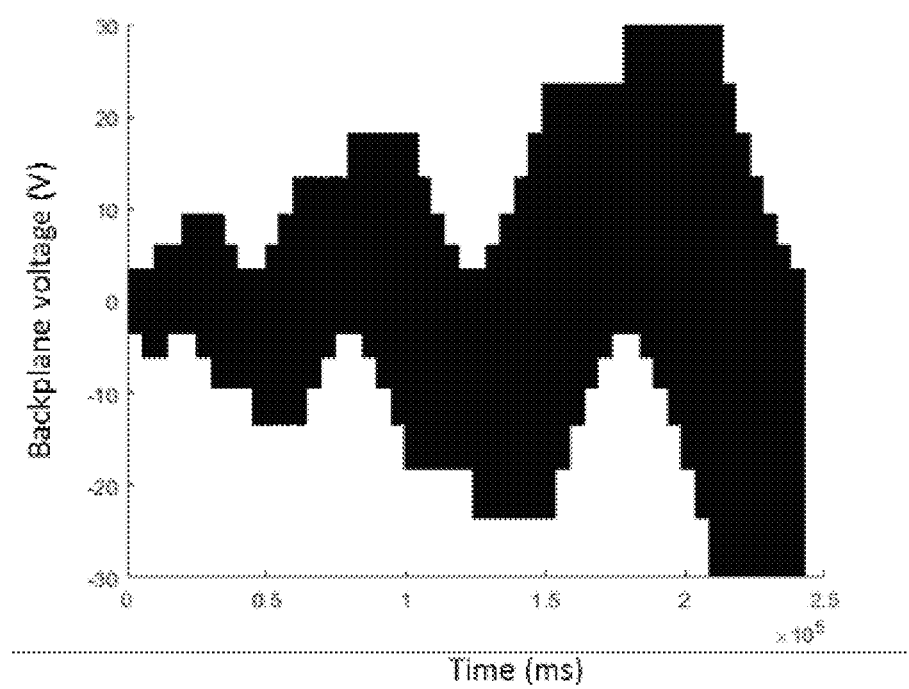
FIG. 4 shows another waveform used to drive display samples including dispersions according to various embodiments of the present invention.

The devices were tested electro-optically in a manner similar to that described in U.S. Pat. No. 9,921,451, Example 11, part D. The waveforms used are illustrated in FIGS. 3 and 4. The waveform of FIG. 3 is similar to that illustrated in FIG. 7B of U.S. Pat. No. 9,921,451, and is intended to produce a cyan color. The voltages shown in FIG. 3 refer to the backplane of the device relative to the front plane (the viewing surface).

After application of the waveform of FIG. 3 the reflection spectrum of the display device was measured. The optical density recorded was converted to "analytical densities": i.e., the contributions to the observed absorption spectrum of each individual colored pigment. Analytical densities were determined after a baseline correction to compensate for optical losses in the display device. The quality of the cyan color was then estimated as the analytical density corresponding to absorption of light by the cyan pigment minus the greater of the analytical densities corresponding to absorption of light by the magenta and yellow pigments. The greater this value, the more ideal the cyan color was deemed to be.

The waveform of FIG. 4 (which again shows the voltage applied to the back plane relative to the front plane) is intended to probe the total color gamut (i.e., the volume of all colors addressable by the device). The waveform is built from "dipoles", i.e., pairs of pulses of opposite polarity, whose duration and magnitude are systematically varied as shown by the dark envelope in the figure. The voltages explored are +/−3.5, 6.1, 9.4, 13.4, 18.2, 23.7, and 30V and the pulse length durations are 50, 80, 120, 190, and 300 milliseconds. For every voltage pair (+,−), every pulse duration pair is visited once. This is done in such a way that the pulse duration pair in one dipole has exactly one value changed in the next dipole, and this value is adjacent in the ordered list of pulse duration values. The voltages are explored in a similar fashion. In this way the waveform is the as smooth in its variations as possible, in that successive dipoles are as similar as possible to each other. The reflection spectra are obtained throughout the waveform (not only at its conclusion) and converted to CIEL*a*b* units. The volume of the convex hull surrounding this cloud of points in the three-dimensional color space (in units of $\Delta E^3$) is taken to be the total color gamut available to that particular display device.

Figure 5:
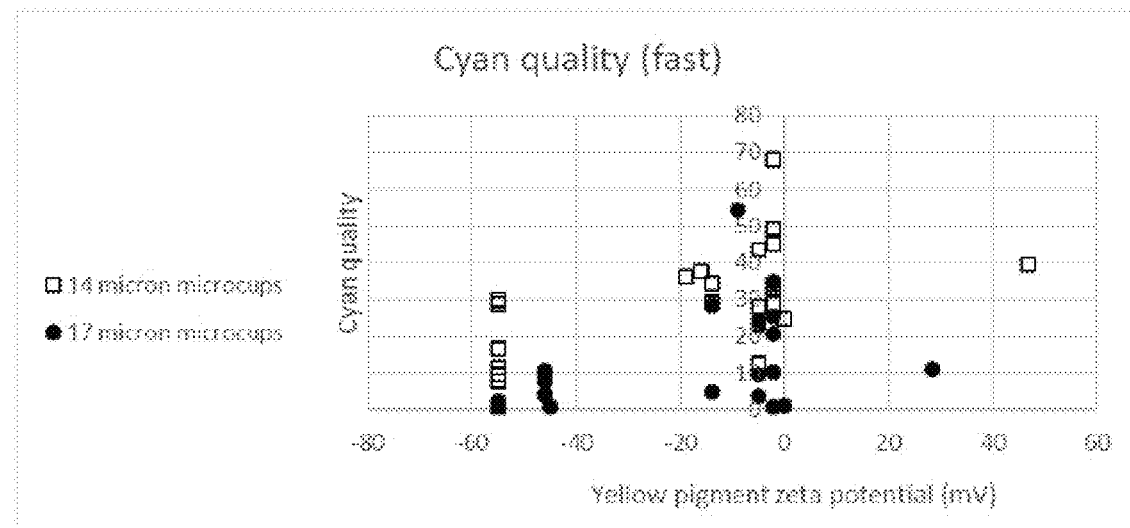
FIG. 5 is a graph showing the cyan quality obtained by application of the waveform of FIG. 3 as a function of the zeta potential of pigments included in displays made according to various embodiments of the present invention.
Figure 6:
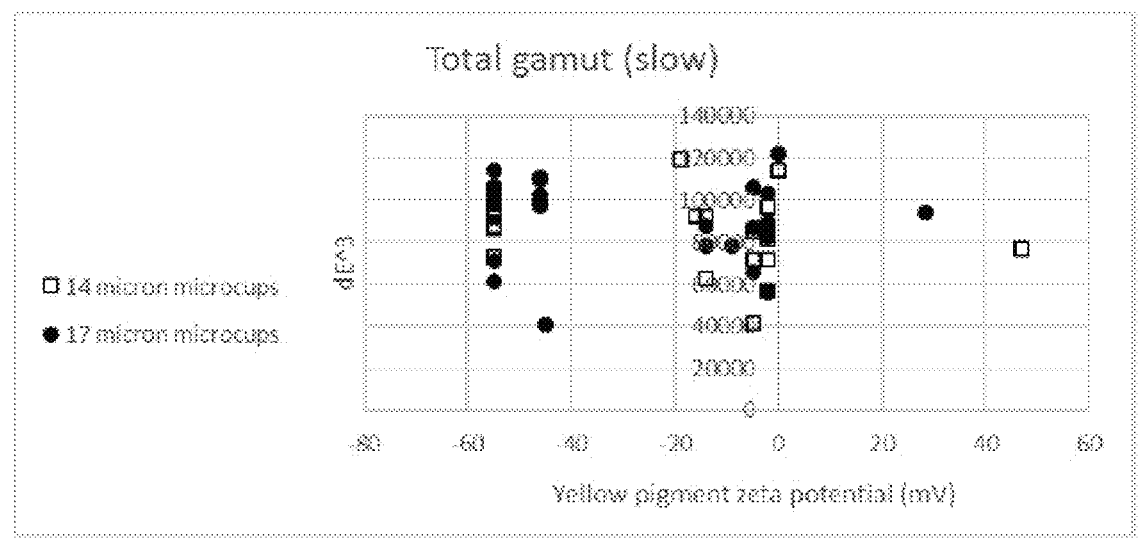
FIG. 6 is a graph showing the total gamut obtained by application of the waveform of FIG. 4 as a function of the zeta potential of pigments included in displays made according to various embodiments of the present invention.

FIGS. 5 and 6 show the cyan quality obtained by application of the waveform of FIG. 3 and the total gamut obtained by application of the waveform of FIG. 4 as a function of the zeta potential of the yellow pigment. As mentioned above, the points corresponding to a zeta potential of −55 mV derive from a non-functionalized, control yellow pigment.

It can be seen in FIG. 5 that a superior cyan quality score can be obtained when the magnitude of the zeta potential of the yellow pigment is below about 20 mV. The cyan quality score is also greater using the thinner microcups (14 micron) versus the thicker microcups (17 micron). Using the thicker microcups the cyan quality score is very poor when the magnitude of the zeta potential of the yellow pigment is above about 20 mV.

Without wishing to be bound by theory, it is believed that the improved cyan quality score achieved with the yellow pigments made according to the embodiments of the invention is attributed to their low mobility. When the yellow pigment is positively charged and has a high mobility it becomes very similar in properties to the cyan pigment. As a result, it is difficult to distinguish between these two colors with any applied waveform. When the yellow pigment is negatively chained and has a high mobility, on the other hand, it becomes difficult to separate from the white pigment, at least with a short applied waveform.

It is apparent from FIG. 6 that when a long waveform is used (such as that illustrated in FIG. 4) a high color gamut can be obtained with all of the yellow pigments, possibly dropping slightly when a positively-charged yellow pigment of high mobility is used. FIG. 7 shows that a high cyan quality score with the fast waveform of FIG. 3 is obtainable without sacrifice of the total color gamut measured with the waveform of FIG. 4.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The electrophoretic media of the present application may contain any of the additives used in traditional electrophoretic media as described for example in the E Ink and MIT patents and applications mentioned above. Thus, for example, the electrophoretic medium of the present application will typically comprise at least one charge control agent (CCA) to control the charge on the various particles, and the fluid may have dissolved or dispersed therein a polymer having a number average molecular weight in excess of about 20,000 and being essentially non-absorbing on the particles to improves the bistability of the display, as described for example in U.S. Pat. No. 7,170,670.

All of the aforementioned patents and patent application publications are incorporated by reference herein in their entireties. In the event of any inconsistency between the content of this application and any of the patents and applications incorporated by reference herein, the content of this application shall control to the extent necessary to resolve such inconsistency.

The invention claimed is:

1. An electrophoretic medium comprising:
a fluid;
a plurality of light scattering charged particles having a first polarity; and
a first, second, and third set of charged particles, each set having a color different from each other set,
wherein the first and second particles have a second polarity opposite to the first polarity, and
the third particles are composite particles comprising a core pigment and a polymer shell, wherein:
(a) a mass fraction of the polymer shell to the composite particle is at least 20 wt % to at most 50 wt %; and
(b) the polymer shell comprises:
(I) a first monomeric unit derived from a first precursor of Formula (1):

wherein: $R^{1a}$ is —H or —CH$_3$; $R^2$ is —OR$^3$, —NHR$^3$, or —NR$^3{}_2$; $R^3$ is $C_{1-6}$ alkyl, $C_{1-6}$ heteroalkyl, $C_{3-10}$ cycloalkyl, $C_{3-10}$ heterocycloalkyl, $C_{6-14}$ aryl, $C_{5-14}$ heteroaryl, or any combination thereof, each of which is optionally substituted one more times by groups selected independently from $R^4$;

$R^4$ is a $C_{1-6}$ alkyl, —OH, $C_{1-6}$ alkoxy, —$NH_2$, —$NH(C_{1-6}$alkyl), —$N(C_{1-6}$ alkyl$)_2$, $C_{1-6}$ haloalkyl, or $C_{1-6}$ haloalkoxy;

(II) a second monomeric unit derived from a second precursor of Formula (2):

wherein: $R^{1b}$ is —H or —$CH_3$; $R^5$ is —$OR^6$, —$NHR^6$, or —$NR^6_2$; $R^6$ is $C_{1-6}$ alkyl, $C_{1-6}$ heteroalkyl, $C_{3-10}$ cycloalkyl, $C_{3-10}$ heterocycloalkyl, $C_{6-14}$ aryl, $C_{5-14}$ heteroaryl, or any combination thereof, each of which is substituted one or more times by groups selected independently from $R^7$; $R^7$ is a halogen, —CN, —$NO_2$, —S(O)—, or —$S(O)_2$—.

2. The electrophoretic medium of claim 1, wherein $R^3$ is $C_{1-6}$ alkyl, $C_{6-14}$ aryl, or any combination thereof, each of which is optionally substituted one or more times by groups selected independently from $R^4$; and $R^4$ is a $C_{1-6}$ alkyl, or $C_{1-6}$ alkoxy.

3. The electrophoretic medium of claim 1, wherein $R^2$ is —$OR^3$, and $R^3$ is $C_{1-6}$ alkyl or $C_{6-14}$ aryl, the $C_{6-14}$ aryl optionally substituted one or more times by groups selected independently from $R^4$; and $R^4$ is $C_{1-6}$ alkoxy.

4. The electrophoretic medium of claim 1, wherein $R^6$ is $C_{1-6}$ alkyl and $R^7$ is a halogen.

5. The electrophoretic medium of claim 1, wherein $R^5$ is —$OR^6$, $R^6$ is $C_{1-6}$ alkyl substituted at least three times by $R^7$, and $R^7$ is —F.

6. The electrophoretic medium of claim 1, wherein the first precursor is selected from the group consisting of methyl methacrylate, methoxyphenyl methacrylate, and N,N-di-isopropylacrylamide.

7. The electrophoretic medium according to claim 1, wherein the second precursor is trifluoroethyl methacrylate (TFEM).

8. A front plane laminate, double release sheet, inverted front plane laminate or electrophoretic display comprising an electrophoretic medium according to claim 1.

9. An electronic book reader, portable computer, tablet computer, cellular telephone, smart card, sign, watch, shelf label or flash drive comprising an electrophoretic display according to claim 8.

10. An electrophoretic medium comprising,
a fluid;
a plurality of light scattering charged particles having a first polarity; and
a first, second, and third set of charged particles, each set having a color different from each other set,
wherein the first and second particles have a second polarity opposite to the first polarity, and the magnitude of the electrophoretic mobility of the third set of particles is less than half of the magnitude of the electrophoretic mobility of the light scattering particles, the first set of charged particles, and the second set of charged particles.

11. The electrophoretic medium according to claim 10, wherein electrophoretic mobility is measured from particle zeta potentials.

12. The electrophoretic medium according to claim 11, wherein the third set of particles has a zeta potential greater than or equal to −20 mV and less than or equal to 20 mV.

13. The electrophoretic medium according to claim 10, wherein electrophoretic mobility is measured from particle charge-to-mass ratios.

14. The electrophoretic medium according to claim 10, wherein electrophoretic mobility is measured from particle dispersion conductivity measurements.

15. A front plane laminate, double release sheet, inverted front plane laminate or electrophoretic display comprising an electrophoretic medium according to claim 10.

16. An electronic book reader, portable computer, tablet computer, cellular telephone, smart card, sign, watch, shelf label or flash drive comprising an electrophoretic display according to claim 15.

17. An electrophoretic medium comprising,
a fluid;
a plurality of light scattering charged particles having a first polarity; and
a first, second, and third set of charged particles, each set having a color different from each other set,
wherein the first and second particles have a second polarity opposite to the first polarity, and
the third particles are composite particles comprising a core pigment and a polymer shell, wherein:
(a) a mass fraction of the polymer shell to the composite particle is at least 20 wt % to at most 50 wt %, and
(b) the polymer shell comprises:
(I) a first monomeric unit derived from a first precursor of Formula (1):

wherein: $R^{1a}$ is —H or —$CH_3$; $R^2$ is —$OR^3$, —$NHR^3$, or —$NR^3_2$; $R^3$ is $C_{1-6}$ alkyl, $C_{1-6}$ heteroalkyl, $C_{3-10}$ cycloalkyl, $C_{3-10}$ heterocycloalkyl, $C_{6-14}$ aryl, $C_{5-14}$ heteroaryl, or any combination thereof, each of which is optionally substituted one more times by groups selected independently from $R^4$, $R^4$ is a $C_{1-6}$ alkyl, —OH, $C_{1-6}$ alkoxy, —$NH_2$, —$NH(C_{1-6}$ alkyl), —$N(C_{1-6}$ alkyl$)_2$, $C_{1-6}$ haloalkyl, or $C_{1-6}$ haloalkoxy;

(II) a second monomeric unit derived from a styrene optionally substituted one or more times by groups selected independently from $C_{1-6}$ alkyl, $C_{1-6}$ alkoxy, —$NH(C_{1-6}$ alkyl), —$N(C_{1-6}$ alkyl$)_2$, and halogen.

18. The electrophoretic medium of claim 17, wherein $R^3$ is $C_{1-6}$ alkyl, $C_{6-14}$ aryl, or any combination thereof, each of which is optionally substituted one or more times by groups selected independently from $R^4$; and $R^4$ is a $C_{1-6}$ alkyl, or $C_{1-6}$ alkoxy.

19. The electrophoretic medium of claim 17, wherein $R^2$ is —$OR^3$, and $R^3$ is $C_{1-6}$ alkyl or $C_{6-14}$ aryl, the $C_{6-14}$ aryl optionally substituted one or more times by groups selected independently from $R^4$; and $R^4$ is $C_{1-6}$ alkoxy.

20. The electrophoretic medium according to claim 17, wherein in third particles a mass fraction of the polymer shell to the composite particle is at least 25 wt % to at most 40 wt %.

21. The electrophoretic medium according to claim 17, wherein the mass fraction of the polymer shell to the composite particle is measured by thermogravimetric analysis (TGA).

22. A front plane laminate, double release sheet, inverted front plane laminate or electrophoretic display comprising an electrophoretic medium according to claim 17.

23. An electronic book reader, portable computer, tablet computer, cellular telephone, smart card, sign, watch, shelf label or flash drive comprising an electrophoretic display according to claim 22.

* * * * *